Sept. 11, 1962 W. E. FOLKERTS 3,053,109
STEERING GEAR
Filed Oct. 5, 1959 2 Sheets-Sheet 1
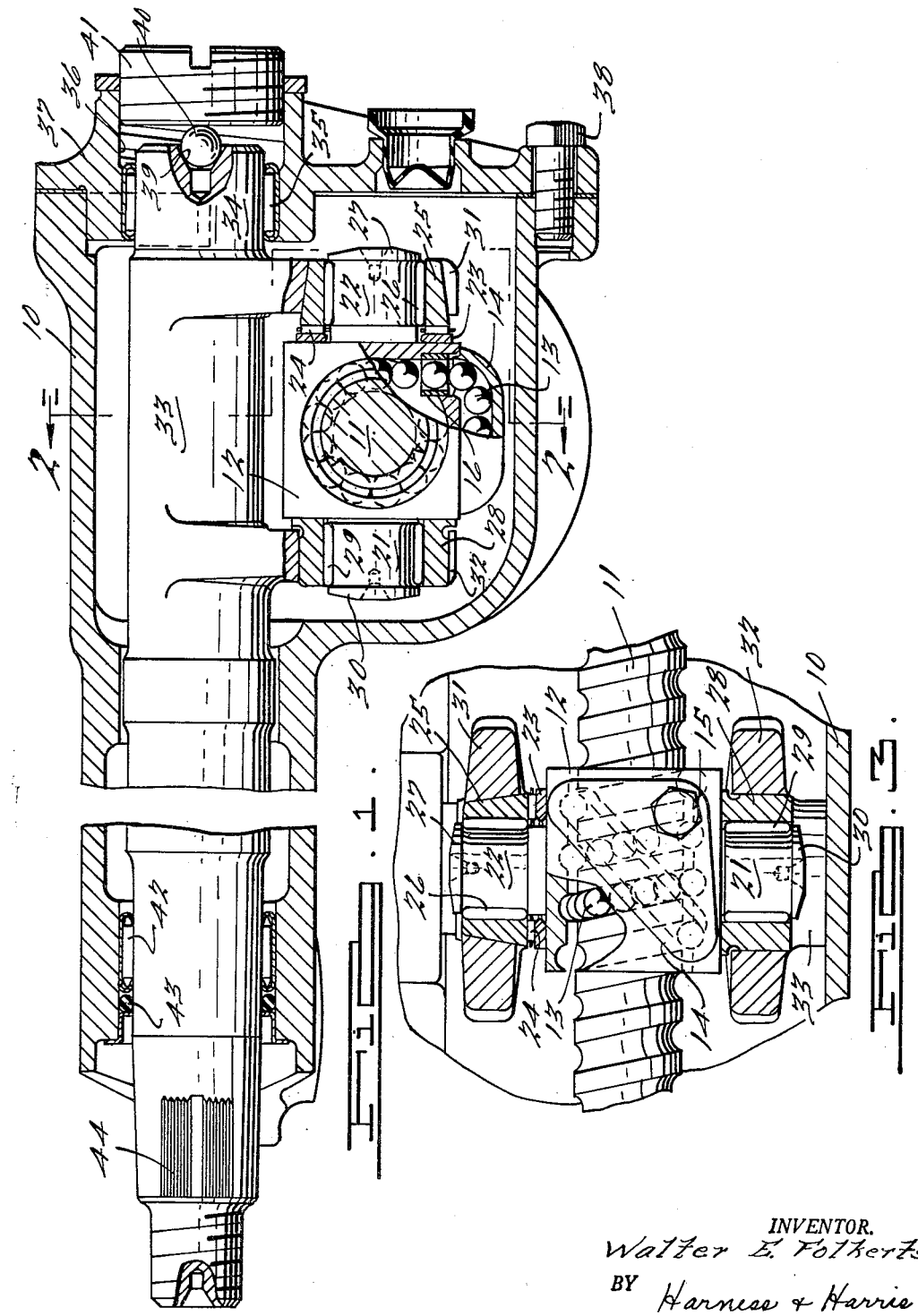
INVENTOR.
Walter E. Folkerts
BY Harness & Harris
ATTORNEYS.

Sept. 11, 1962 W. E. FOLKERTS 3,053,109
STEERING GEAR
Filed Oct. 5, 1959 2 Sheets-Sheet 2
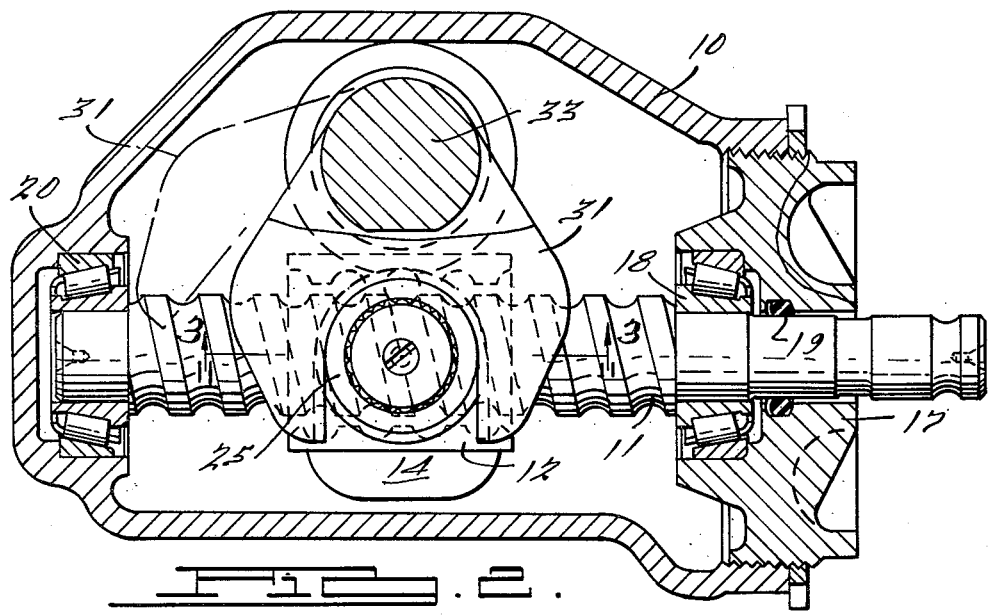
INVENTOR.
Walter E. Folkerts.
BY Harness & Harris
ATTORNEYS.

United States Patent Office 3,053,109
Patented Sept. 11, 1962

3,053,109
STEERING GEAR
Walter E. Folkerts, Hazel Park, Mich., assignor to Chrysler Corporation, Highland Park, Mich., a corporation of Delaware
Filed Oct. 5, 1959, Ser. No. 844,410
13 Claims. (Cl. 74—499)

This invention relates to steering gears particularly of the ball-nut and lever type for motor vehicles.

In a common steering gear construction of the above type, a rockshaft operably coupled with the vehicle dirigible wheels is pivoted by means of an integral pair of bifurcations or yokes which engage a pair of trunnions extending in opposite directions from a nut. The latter rides axially along a worm under manual control of a steering wheel, whereby upon rotation of the worm, the trunnions engaging the yokes swing the rockshaft to effect the desired steering movement. In such a structure, it is important to minimize play or lost motion in the connection between the worm and rockshaft, particularly at the neutral or straight ahead steering position, and also to distribute the steering load equally to both trunnions in order to prevent undue wear of one trunnion and the resulting increased play or lost motion in the steering mechanism.

It is accordingly an important object of the present invention to provide an improved structure of the foregoing character including improved means for adjusting the load between one of the trunnions and its associated yoke, whereby the load on both trunnions is readily balanced and whereby compensation for unequal wear in the driving connection between the trunnions and their associated yokes is readily obtained.

Another object is to provide such a structure having improved means for positively minimizing play or lost motion in the connection between the worm and the rockshaft when the steering gear is at the straight-ahead steering position.

Another object is to provide such a structure which facilitates and reduces the cost of manufacture by feasibly enabling a relaxation in production tolerances that must otherwise be very closely maintained.

Still another and more specific object is to provide a nut movable axially of the worm and having a pair of coaxial trunnions extending in opposite directions from the worm axis in parallelism with the axis of the rockshaft, one trunnion having a cylindrical yoke engaging roller journalled thereon and the other trunnion having a conical yoke engaging roller journalled thereon. The outer periphery of the conical roller is tapered to engage a mating tapered inner surface of the associated yoke. The outer periphery of the cylindrical roller is parallel to the axis of the trunnion and the mating inner surface of its associated yoke, whereby axial shifting of the rockshaft to cause corresponding shifting of the yokes will adjust the snugness of engagement between the conical roller and its yoke without effecting the snugness of engagement between the cylindrical roller and its yoke, except at the straight-ahead steering position as described below.

It is apparent that by virtue of employing only one tapered roller in combination with one cylindrical roller, load equalization thereon is readily accomplished by axially adjusting the position of the rockshaft and its integral yokes. The expense and production difficulty of maintaining precise tolerances between the trunnions and associated yokes, so as to balance the load on the two trunnions, is rendered unnecessary.

Another object is to provide such a structure wherein each trunnion bottoms against the crotch of its associated yoke or bifurcation, when the steering gear is at the straight-ahead steering position, and moves away from the associated crotch when the steering gear moves in either direction from the straight-ahead position. The crotch of the yoke mating with the tapered roller is located with respect to the latter roller so that by suitably adjusting the axial position of the rockshaft, the tapered roller will bottom against the crotch of its yoke slightly before the steering gear moves from either direction to the straight-ahead position and also slightly before the cylindrical roller bottoms against the crotch of its associated yoke. In consequence the two trunnions will be subject to a cramping action with progressively increasing force as the steering gear moves to the straight-ahead steering position, whereby play at that position in the connection between the worm and rockshaft is virtually eliminated.

Another object is to provide a conical roller as above described which is crowned slightly in opposite directions from its central region of contact with its yoke. Thus alignment between the tapered surfaces of the roller and associated yoke is facilitated and jamming of the tapered roller between the arms of the tapered yoke is minimized.

Another object is to provide simple improved means for adjusting the rockshaft axially and for maintaining suitable tension thereon urging the tapered roller yieldingly into engagement with the tapered sides of its associate yoke.

Other objects of this invention will appear in the following description and appended claims, reference being had to the accompanying drawings forming a part of this specification wherein like reference characters designate corresponding parts in the several views.

FIGURE 1 is a sectional view taken through the lower portion of an automobile steering gear at the region of the ball-nut connection between the steering shaft and the rockshaft.

FIGURE 2 is a section longitudinally of the steering shaft taken in the direction of the arrows substantially along the line 2—2 of FIGURE 1.

FIGURE 3 is a fragmentary sectional view taken in the direction of the arrows substantially along the line 3—3 of FIGURE 2.

FIGURE 4 is a view similar to FIGURE 1, but showing a modification of the means for tensioning the rockshaft.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to FIGURES 1–3, a particular application of the present invention is illustrated by way of example in a ball-nut type steering gear comprising an outer housing 10 containing a spirally grooved worm 11 adapted to be operably connected with the conventional vehicle steering wheel. A nut 12 having internal spiral grooves mating with the grooves of the worm 11 is connected coaxially with the latter by means of a plurality of recirculating balls 13 confined within the mating spiral grooves. Recirculation of the balls 13 may be accomplished by conventional means, as for example by a tunnel communicating with separate portions of the mating spiral grooves so as to receive the balls from adjacent one end of the nut and to return the balls adjacent the opposite end of the nut. In the present instance the crossover tunnel includes an external part 14 secured to the nut 12 by a bolt 15, FIGURE 3. Opposite ends of the tunnel portion 14 communicate with paired tunnel portions 16 which extend within the body of the nut 12 tangentially to the spiral grooves of the worm and nut so as to receive or discharge the balls 13 into the grooves, depending upon the direction of rotation of worm 11. Accordingly upon relative rotation of the worm 11 with respect to the nut 12, the latter is caused to travel axially of the worm.

A reduced diameter shaft portion of worm 11 at the right in FIGURE 2 extends through an annular closure plate 17 screwed into a portion of the housing 10 and is journalled within the plate 17 by means of a thrust bearing assembly 18. An annular seal 19 around the shaft of worm 11 prevents axial loss of lubricating fluid from the housing 10. Externally of the housing 10, the right end of the worm shaft is adapted for attachment with a conventional vehicle steering shaft which in turn is manually controlled by a steering wheel. A reduced diameter left end portion of the shaft of worm 11 is journalled in the housing 10 by means of a thrust bearing assembly 20. The structure thus far may be conventional and is accordingly not described in further detail.

Extending radially of the worm 11 in opposite directions from the nut 12 and integral therewith is a pair of trunnions 21 and 22. Seated against the body of nut 12 around trunnion 22 at the right in FIGURE 1 is an annular bearing race 23 which is spaced by an annular set of needle bearings 24 from the large base of a conical roller 25. The latter has a cylindrical inner circumference journalled coaxially on trunnion 22 by means of an annular set of needle bearings 26 and has an outer circumference which tapers to the right in FIGURE 1 or endwise from the nut 12. An integral flared end cap 27 of trunnion 22 retains the needle bearings 26 in place.

The left trunnion 21, FIGURE 1, carries a roller 28 journalled thereon by means of an annular set of needle bearings 29, the roller 28 having cylindrical inner and outer circumferences coaxial with trunnion 21. The needle bearings 29 are retained in position by a flared end cap 30 integral with the left end of trunnion 21.

The rollers 25 and 28 are closely confined between a pair of forked yokes or bifurcations 31 and 32 integral with and extending radially from a rockshaft 33. The inner surface of the bifurcation engaging roller 25 is inclined at an angle mating with the angle of taper of roller 25, whereas the inner surface of bifurcation 32 engaging roller 28 is parallel with the latter's outer cylindrical surface and with the axis of the coaxial trunnions 21 and 22.

The rockshaft 33 extends transversely of the axis of worm 11 and is provided with a right end extension 34 which is journalled by means of an annular set of needle bearings 35 within the bore 36 of an end closure member 37 secured to the housing 10 by bolts 38. A conical inwardly tapering seat 39 is formed in the right end of extension 34 for a spherical thrust bearing 40 which is retained in adjusted position by an adjusting screw 41 screwed into a threaded end portion of the bore 36. Leftward of the bifurcations 31 and 32, the rockshaft 33 is rotatably supported within the housing 10 by needle bearings 42. A seal 43 prevents loss of lubricating fluid from the housing 10. Externally of the housing 10 at the left in FIGURE 1, rockshaft 33 is provided with a splined portion 44 adapted for operative attachment with the vehicle's dirigible wheels to steer the same in accordance with rocking of shaft 33.

Upon rotation of worm shaft 11 in one direction or the other, nut 12 is caused to travel axially of the worm in one direction or the opposite. The rollers 25 and 28 in rolling contact with the arms of their associated yokes 31 and 32 respectively swing the latter and rockshaft 33 as indicated by the phantom position in FIGURE 2. As the yokes or bifurcations 31 and 32 swing in either direction from the neutral or straight ahead steering position illustrated in FIGURE 2, the nut 12 is prevented from rotating within housing 10 about the axis of worm 11 by reason of the close engagement between the rollers 25 and 28 and the arms of the bifurcations 31 and 32, and also by virtue of the taper of roller 25 mating with and closely engaging the inner surface of the bifurcation 31, which latter factor is effective in preventing rotation of nut 12 even at the neutral or straight-ahead steering position. Also at the position of straight ahead steering illustrated in the drawings, each of the rollers 25 and 28 snugly engages the crotch or juncture of the bifurcated arms of the corresponding yoke 31 or 32 to prevent rotation of nut 12. By suitably tightening the adjusting screw 41, the axial position of rockshaft 33 is determined so as to achieve a particularly snug fit between each roller 25 and 28 and the corresponding crotch or juncture of the bifurcations 31 and 32.

In order to eliminate play positively between the worm 11, nut 12, and rockshaft 33 at the neutral or straight ahead steering position of FIGURES 1 and 2, the crotches of yokes 31 and 32 are located with respect to rollers 25 and 28, and the axial position of the rockshaft 33 is adjusted by means of screw 41, so that the tapered roller 25 will engage the crotch of yoke 31 slightly before the rockshaft 33 swings from either direction to the neutral position shown. Upon continued swinging of the rockshaft 33 to the neutral or straight ahead steering position, the roller 28 will snugly engage the crotch of yoke 32. The roller 25 and trunnion 22 will then be subject to a cramping action tending to rotate nut 12 clockwise in FIGURE 1, thereby to cam roller 28 forcibly against the crotch of its associated yoke 32. In consequence at the straight ahead steering position where play in the steering linkage is most objectionable, such play is virtually eliminated in the ball-nut connection between the worm 11 and rockshaft 33.

It is to be noted that the adjustment feature shown enables compensation for wear of the rollers 25 and 28 and in particular for wear between roller 25 and its yoke 31. In addition the use of a single tapered roller 25 in combination with a cylindrical roller 28 simplifies construction and enables relaxation of production tolerances with consequent economies. Slight production variations in the diameter of roller 28 or the position of the crotch of yoke 32 by way of example are readily compensated for by axially shifting rockshaft 33 until the cam action between yoke 31 and tapered roller 25 equalizes the load on rollers 25 and 28 at all steering positions and effects a snug fit between roller 28 and the crotch of yoke 32 at the neutral or straight ahead steering position.

FIGURE 4 shows a structure similar in all respects to that of FIGURES 1–3 in regard to the operable ball-nut connection between the worm 11 and rockshaft 33, except that outer surface of the tapered roller 25 is crowned or curved radially inwardly toward its opposite edges 25a and 25b so as to engage the inner tapered surfaces of yoke 31 along a substantially circular line of contact 25c. Thus alignment between the roller 25 and its yoke 31 is facilitated and any tendency to bind the tapered roller 25 between the tapered inner surfaces of bifurcation 31 is minimized. The crowned effect is exaggerated in FIGURE 4 for the sake of illustration. Actually the maximum deviation from the inner surfaces of yoke 31 at the edges 25a and 25b will only be a few thousandths of an inch. However, the crowned outer surface of roller 25 could be circular, if desired, in the sectional view of FIGURE 4. The roller 25 of FIGS. 1–3 can be feasibly employed with the structure of FIGURE 4. Conversely the crowned roller 25 of FIG. 4 can be feasibly employed with the structure of FIGS. 1–3.

In FIGURE 4, instead of providing a threaded adjusting screw 41 engageable with thrust bearing 40, the latter and rockshaft 33 are yieldingly urged to the left by the tension of a coil spring 45 confined within a tubular spring housing 46 screwed into bore 36. The tension of spring 45 is adjusted by screw 47 which screws into the right end of housing 46. Paired spring seats 48 and 49 at opposite ends of spring 45 space the latter from thrust bearing 40 and the inner end of screw 47 respectively.

In accordance with the structure shown, rockshaft 33 and the tapered arms of yoke 31 are yieldingly urged leftward to assure a snug engagement with the conical roller 25 and also to assure snug engagement between roller 28 and the crotch of its associated yoke 32 when the rockshaft 33 is at the neutral straight ahead steering position illustrated.

I claim:

1. In a steering gear, a reciprocable member having a pair of oppositely directed projections extending transversely of the directions of reciprocating movement of said member, a rocking member having a pivot axis extending transversely of said directions and having separate integral swinging arms, said arms being movable as a unit and having fixed axial spacing therebetween, said arms closely engaging said projections respectively for concurrent reciprocating and rocking movement of said members respectively, one of said projections and its engaging arm contacting at a cam surface disposed at an angle to said pivot axis to adjust the snugness of engagement therebetween upon relative adjusting movement of one of said members with respect to the other longitudinally of said pivot axis, the other of said projections and its engaging arm contacting along lines parallel to said pivot axis to enable said adjusting movement, and means for effecting said adjusting movement.

2. In a steering gear, a reciprocable member having a pair of oppositely directed projections extending transversely of the directions of reciprocating movement of said member, a rocking member having a pivot axis extending transversely of said directions and having a pair of integral bifurcations forking said projections respectively to effect concurrent reciprocating and rocking movement of said members respectively, said bifurcations being movable as a unit and having a fixed axial spacing therebetween, at least one of the elements comprising one of said bifurcations and its forked projection having tapered cam surfaces engaging the other of said elements at an angle oblique to said axis to adjust the snugness of engagement between said elements upon relative adjusting movement of one of said members with respect to the other longitudinally of said pivot axis, the other of said bifurcations and its forked projection engaging along lines parallel to said pivot axis to enable said adjusting movement, and means for effecting said adjusting movement.

3. In a steering gear, a worm, a nut member engaging said worm for reciprocating movement therealong, said nut member having a pair of oppositely directed projections extending transversely of the axis of said worm, a rocking member having a pivot axis extending transversely of the axis of said worm and having separate swinging arms closely engaging said projections respectively to effect concurrent reciprocating and rocking movement of said members respectively, said arms being integral with said rocking member and movable as a unit therewith and having a fixed axial spacing therebetween, one of said projections and its engaging arm contacting at a cam surface disposed at an angle to said pivot axis to adjust the snugness of engagement therebetween upon relative adjusting movement of one of said members with respect to the other longitudinally of said pivot axis, the other of said projections and its engaging arm contacting along lines parallel to said pivot axis to enable said adjusting movement, and means for effecting said adjusting movement.

4. In a steering gear, a worm, a nut member engaging said worm for reciprocating movement therealong, said nut member having a pair of oppositely directed projections extending transversely of the axis of said worm, a rocking member having a pivot axis extending transversely of the axis of said worm and having a pair of integral bifurcations forking said projections respectively to effect concurrent reciprocating and rocking movement of said members respectively, said bifurcations being movable as a unit with said rocking member and having a fixed axial spacing therebetween, at least one of the elements comprising one of said bifurcations and its forked projection having tapered cam surfaces engaging the other of said elements at an angle oblique to said axis to adjust the snugness of engagement between said elements upon relative adjusting movement of one of said members with respect to the other longitudinally of said pivot axis, the other of said bifurcations and its forked projection engaging along lines parallel to said pivot axis to enable said adjusting movement, and means for effecting said adjusting movement.

5. In a steering gear, a reciprocable member having a pair of oppositely directed projections extending transversely of the directions of reciprocating movement of said member, a rocking member having a pivot axis extending transversely of said directions and having a pair of integral bifurcations forking said projections respectively to effect concurrent reciprocating and rocking movement of said members respectively, said bifurcations being movable as a unit with said rocking member and having a fixed axial spacing therebetween, each bifurcation at the juncture of its two parts engaging its respective projection when said steering gear is at a condition for straight ahead steering, said junctures and projections being increasingly separated upon pivoting of said rocking member in either direction from the straight ahead steering condition, at least one of the engaging surfaces between one of said projections and its forking bifurcation adjacent said juncture of its parts being tapered at an angle oblique to said pivot axis to adjust the snugness of engagement between said surfaces at said straight ahead steering condition upon relative adjusting movement of one of said members with respect to the other longitudinally of said pivot axis, the engaging surfaces of the other projection and its forking bifurcation adjacent said juncture of the latter's parts engaging along lines parallel to said pivot axis to enable said adjusting movement, and means for effecting said adjusting movement.

6. In a steering gear, a worm, a nut member engaging said worm for reciprocating movement therealong, said nut member having a pair of oppositely directed projections extending transversely of the axis of said worm, a rocking member having a pivot axis extending transversely of the axis of said worm and having a pair of integral bifurcations forking said projections respectively to effect concurrent reciprocating and rocking movement of said members respectively, said bifurcations being movable as a unit with said rocking member and having a fixed axial spacing therebetween, each bifurcation at the juncture of its two parts engaging its respective projection when said steering gear is at a condition for straight ahead steering, said junctures and projections being increasingly separated upon pivoting of said rocking member in either direction from the straight ahead steering condition, at least one of the engaging surfaces between one of said projections and its forking bifurcations adjacent said juncture of its parts being tapered at an angle oblique to said pivot axis to adjust the snugness of engagement between said surfaces at said straight ahead steering condition upon relative adjusting movement of one of said members with respect to the other longitudinally of said pivot axis, the engaging surfaces of the other projection and its forking bifurcation adjacent said juncture of the latter's parts engaging along lines parallel to said pivot axis to enable said adjusting movement, and means for effecting said adjusting movement.

7. In a steering gear, a reciprocable member having a pair of oppositely directed projections extending transversely of the directions of reciprocating movement of said member, a rocking member having a pivot axis extending transversely of said directions and having a pair of integral yokes forking said projections respectively to effect concurrent reciprocating and rocking movement of said members respectively, said pair of yokes comprising a unitary structure with said rocking member and having a fixed axial spacing therebetween, each projection engaging the crotch of its forking yoke when said gear is at a predetermined steering condition and being increasingly separated from the said crotch upon pivoting of said rocking member in either direction from said predetermined steering condition, the crotch of one of said yokes having a tapered inner surface engaging a mating tapered outer surface of its forked projection to adjust the snugness of engagement between said surfaces upon relative adjusting movement between said members longitudinally of said pivot axis, the inner and outer surfaces of the other yoke and its forked projection respectively engaging along lines parallel to said pivot axis to enable said adjusting movement, and means for effecting said adjusting movement.

8. In a steering gear, a worm, a reciprocable nut member movable along said worm and having a pair of oppositely directed trunnions extending transversely of the axis of said worm, a rocking member having a pivot axis extending transversely of the axis of said worm and having a pair of integral swinging yokes forking said trunnions respectively to effect concurrent reciprocating and rocking movement of said members respectively, said pair of yokes comprising a unitary structure with said rocking member and having a fixed axial spacing therebetween, each trunnion engaging the crotch of its associated yoke when said gear is at a condition for straight ahead steering and being increasingly separated from said crotch upon pivoting of said rocking member in either direction from said straight ahead steering condition, the crotch of one of said yokes having a tapered inner surface engaging a mating tapered outer surface of the associated trunnion to adjust the snugness of engagement between said surfaces upon relative adjusting movement between said members longitudinally of said pivot axis, the inner and outer surfaces of the other yoke and its forked trunnion engaging along lines parallel to said pivot axis to enable said adjusting movement, and means for effecting said adjusting movement.

9. In a steering gear, a worm, a reciprocable nut member movable along said worm and having a pair of oppositely directed trunnions extending transversely of the axis of said worm, a rocking member having a pivot axis extending transversely of the axis of said worm and having a pair of integral swinging yokes forking said trunnions respectively to effect concurrent reciprocating and rocking movement of said members respectively, said pair of yokes comprising a unitary structure with said rocking member and having a fixed axial spacing therebetween, each trunnion engaging the crotch of its associated yoke when said gear is at a condition for straight ahead steering and being increasingly separated from said crotch upon pivoting of said rocking member in either direction from said straight ahead steering condition, the crotch of one of said yokes having a tapered inner surface engaging a mating tapered outer surface of the associated trunnion to adjust the snugness of engagement between said surfaces upon relative adjusting movement between said members longitudinally of said pivot axis, the inner and outer surfaces of the other yoke and its forked trunnion engaging along lines parallel to said pivot axis to enable said adjusting movement, and means for effecting said adjusting movement, said members being adjusted so that the mating tapered surfaces of said one crotch and associated trunnion engage slightly prior to the engagement between the other crotch and its associated trunnion upon movement of said gear in either direction toward said straight ahead steering condition.

10. In a steering gear, a worm, a reciprocable nut member movable along said worm and having a pair of oppositely directed trunnions extending transversely of the axis of said worm, a rocking member having a pivot axis extending transversely of the axis of said worm and having a pair of integral swinging yokes forking said trunnions respectively to effect concurrent reciprocating and rocking movement of said members respectively, said pair of yokes comprising a unitary structure with said rocking member and having a fixed axial spacing therebetween, each trunnion engaging the crotch of its associated yoke when said gear is at a condition for straight ahead steering and being increasingly separated from said crotch upon pivoting of said rocking member in either direction from said straight ahead steering condition, the crotch of one of said yokes having a tapered inner surface engaging a mating tapered outer surface of the associated trunnion to adjust the snugness of engagement between said surfaces upon relative adjusting movement between said members longitudinally of said pivot axis, the inner and outer surfaces of the other yoke and its forked trunnion engaging along lines parallel to said pivot axis to enable said adjusting movement, and resilient means yieldingly urging said adjusting movement in the direction tending to increase the snugness of engagement between the mating tapered surfaces of said one crotch and associated trunnion.

11. In a steering gear, a worm, a reciprocable nut member movable along said worm and having a pair of oppositely directed trunnions extending transversely of the axis of said worm, a rocking member having a pivot axis extending transversely of the axis of said worm and having a pair of integral swinging yokes forking said trunnions respectively to effect concurrent reciprocating and rocking movement of said members respectively, said pair of yokes comprising a unitary structure with said rocking member and having a fixed axial spacing therebetween, each trunnion engaging the crotch of its associated yoke when said gear is at a condition for straight ahead steering and being increasingly separated from said crotch upon pivoting of said rocking member in either direction from said straight ahead steering condition, one of said trunnions having a conical surface engageable with mating tapered surfaces at the legs and crotch of the associated yoke to adjust the snugness of engagement between said surfaces upon relative adjusting movement between said members longitudinally of said pivot axis, the other trunnion having a cylindrical surface engageable with parallel surfaces at the legs and crotch of its associated yoke along lines parallel to said pivot axis to enable said adjusting movement, and means for effecting said adjusting movement.

12. In a steering gear, a worm, a reciprocable nut member movable along said worm and having a pair of oppositely directed trunnions extending transversely of the axis of said worm, a rocking member having a pivot axis extending transversely of the axis of said worm and having a pair of integral swinging yokes forking said trunnions respectively to effect concurrent reciprocating and rocking movement of said members respectively, said pair of yokes comprising a unitary structure with said rocking member and having a fixed axial spacing therebetween, each trunnion engaging the crotch of its associated yoke when said gear is at a condition for straight ahead steering and being increasingly separated from said crotch upon pivoting of said rocking member in either direction from said straight ahead steering condition, one of said trunnions having a conical surface engageable with mating tapered surfaces at the legs and crotch of the associated yoke to adjust the snugness of engagement between said surfaces upon relative adjusting movement between said members longitudinally of said pivot axis, the other trunnion having a cylindrical surface engageable with parallel surfaces at the legs and crotch of its associated yoke along lines parallel to said pivot axis to enable said adjusting movement, and resilient means yieldingly urging said adjusting movement in the direction tending to increase the snugness of engagement between the mating tapered surfaces of said one crotch and associated trunnion.

13. In a steering gear, a worm, a reciprocable nut member movable along said worm and having a pair of oppositely directed trunnions extending transversely of the axis of said worm, a rocking member having a pivot axis extending transversely of the axis of said worm and having a pair of integral swinging yokes forking said trunnions respectively to effect concurrent reciprocating and rocking movement of said members respectively, said pair of yokes comprising a unitary structure with said rocking member and having a fixed axial spacing therebetween, each trunnion engaging the crotch of its associated yoke when said gear is at a condition for straight ahead steering and being increasingly separated from said crotch upon pivoting of said rocking member in either direction from said straight ahead steering condition, one of said trunnions having a conical surface engageable with mating tapered surfaces at the legs and crotch of the associated yoke to adjust the snugness of engagement between said surfaces upon relative adjusting movement between said members longitudinally of said pivot axis, the other trunnion having a cylindrical surface engageable with parallel surfaces at the legs and crotch of its associated yoke along lines parallel to said pivot axis to enable said adjusting movement, and means for effecting said adjusting movement, said members being adjusted so that the mating tapered surfaces of said one crotch and associated trunnion engage slightly prior to the engagement between the other crotch and its associated trunnion upon movement of said gear in either direction toward said straight ahead steering condition.

References Cited in the file of this patent

UNITED STATES PATENTS

| 2,648,995 | Doerfner et al. | Aug. 18, 1953 |
| 2,688,260 | Muller | Sept. 7, 1954 |
| 2,906,142 | Wagner | Sept. 29, 1959 |

FOREIGN PATENTS

| 393,839 | Great Britain | June 15, 1933 |